(12) United States Patent
Seo

(10) Patent No.: US 7,450,979 B2
(45) Date of Patent: Nov. 11, 2008

(54) SLIDING MODULE FOR PORTABLE TERMINAL

(75) Inventor: Jung-Hwan Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 358 days.

(21) Appl. No.: 11/210,923

(22) Filed: Aug. 24, 2005

(65) Prior Publication Data
US 2006/0154515 A1  Jul. 13, 2006

(30) Foreign Application Priority Data
Jan. 11, 2005  (KR)  .................. 10-2005-0002518

(51) Int. Cl.
*H04M 1/00* (2006.01)
(52) U.S. Cl. .............. 455/575.4; 455/575.1; 455/575.8; 455/575.3
(58) Field of Classification Search .............. 455/575.8, 455/575.3; 292/48; 379/433.12
See application file for complete search history.

(56) References Cited

U.S. PATENT DOCUMENTS

| | | | | |
|---|---|---|---|---|
| 2,038,794 A | * | 4/1936 | King | ...................... 292/48 |
| 5,151,946 A | * | 9/1992 | Martensson | ............... 455/575.4 |
| 5,232,208 A | * | 8/1993 | Braid et al. | .................. 267/156 |
| 6,733,005 B2 | * | 5/2004 | Kauhaniemi et al. | ........ 267/156 |
| 7,003,104 B2 | * | 2/2006 | Lee | ........................ 379/433.13 |
| 7,269,450 B2 | * | 9/2007 | Lee et al. | .................. 455/575.1 |
| 2008/0081678 A1 | * | 4/2008 | Ko | .......................... 455/575.4 |

FOREIGN PATENT DOCUMENTS

KR      20-0374121      1/2005

* cited by examiner

*Primary Examiner*—Vincent P. Harper
*Assistant Examiner*—Charles Shedrick
(74) *Attorney, Agent, or Firm*—The Farrell Law Firm, PC

(57) ABSTRACT

Disclosed is a sliding module for a portable terminal including a main housing and at least one sub-housing movably mounted on the main housing to perform an opening/closing motion. The sliding module includes a disc rotatably mounted on the main housing; links each of which has a first end coupled to the disc and a second end coupled to one of the sub-housings; and an elastic means providing the disc with a rotating force, wherein the rotating force rotates the disc such a manner that the other ends of the links can move toward the disc in a first interval and the one ends of the links can move away from the disc in a second interval. The first and second sub-housings of the sliding module can realize semi-automatic opening/closing operation of the terminal.

6 Claims, 4 Drawing Sheets

SLIDING MODULE FOR PORTABLE TERMINAL

PRIORITY

This application claims priority to an application entitled "Sliding Module For Portable Terminal" filed in the Korean Industrial Property Office on Jan. 11, 2005 and assigned Serial No. 2005-2518, the contents of which are incorporated herein by reference.

BACKGROUND OF THE INVENTION

1. Field of the Invention

The present invention relates to portable terminals, such as cellular phones, PDAs (personal digital assistants), and HHPs (hand held phones), and more particularly to a sliding module for a portable terminal having at least one sub-housing, which can slide along a main housing.

2. Description of the Related Art

In general, "portable terminal" refers to an apparatus which a user can carry to perform wireless communication with a desired partner. In consideration of portability, designs of such portable terminals have tended to be not only compact, slim, and light, but also to provide multimedia availability, having a wider variety of functions. Additionally, such portable terminals are now commonly used, and are recognized by some people as a nearly indispensible necessity which must be always carried.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip which is pivotably mounted to a bar-shaped housing by a hinge device. The folder-type portable terminal has a folder coupled to a single bar-shaped housing by a hinge device in such a manner that the folder can be rotated in order to be folded to or unfolded from the housing.

Further, portable terminals may be classified into neck wearable type terminals and wrist wearable type terminals according to the position at or the way in which a user puts on the portable terminal. Additionally, portable terminals may be classified into rotation-type terminals and sliding-type terminals according to the manner of opening and closing the portable terminal. These variously classified portable communication apparatuses can be easily understood by those skilled in the art.

Meanwhile, conventional portable terminals are now able to transmit data at a high speed in addition to the basic function of performing voice communication. In other words, according to the increase in demand by consumers, portable terminals are now able to provide services using a wireless communication technology capable of transmitting data at a high speed.

In spite of the diversification of conventional portable terminals, they cannot sufficiently satisfy consumers' diversified tastes. The functions of portable terminals have been widely expanded and the types of services are diversified. Under such circumstances, since the input means of conventional portable terminals is limited, it is inconvenient to manipulate the keys to transmit an e-mail, chat or play a game, which requires a number of data inputs.

SUMMARY OF THE INVENTION

Accordingly, the present invention has been made to solve the above-mentioned problems occurring in the prior art, and an object of the present invention is to provide a sliding module for a portable terminal, which can contribute to further diversify the designs of such modules.

Another object of the present invention is to provide a sliding module for a portable terminal, which is convenient to use, having at least one sub-housing capable of semi-automatically sliding along a main housing.

In order to accomplish this object, there is provided a sliding module for a portable terminal including a main housing and at least one sub-housing, which is movably mounted on the main housing for opening/closing the terminal, the sliding module including a disc rotatably mounted on the main housing; a plurality of links, each having a first end coupled to the disc and a second end coupled to a sub-housing; and an elastic means providing the disc with a rotating force, wherein the rotating force rotates the disc in such a manner that the second end of the links can move toward the disc in a first interval and the first end of the links can move away from the disc in a second interval.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present, a detailed description of known functions and configurations incorporated herein will be omitted when it may make the subject matter of the present invention unclear.

Figure 1:
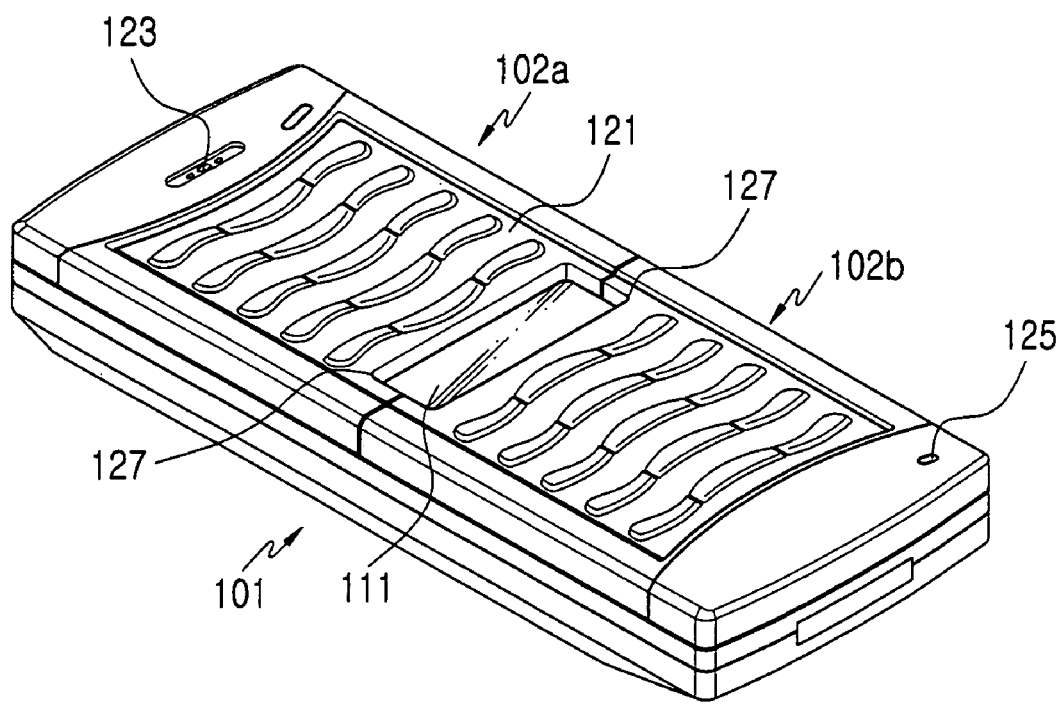
FIG. 1 is a perspective view showing a portable terminal having a sliding module according to a preferred embodiment of the present invention.
Figure 2:
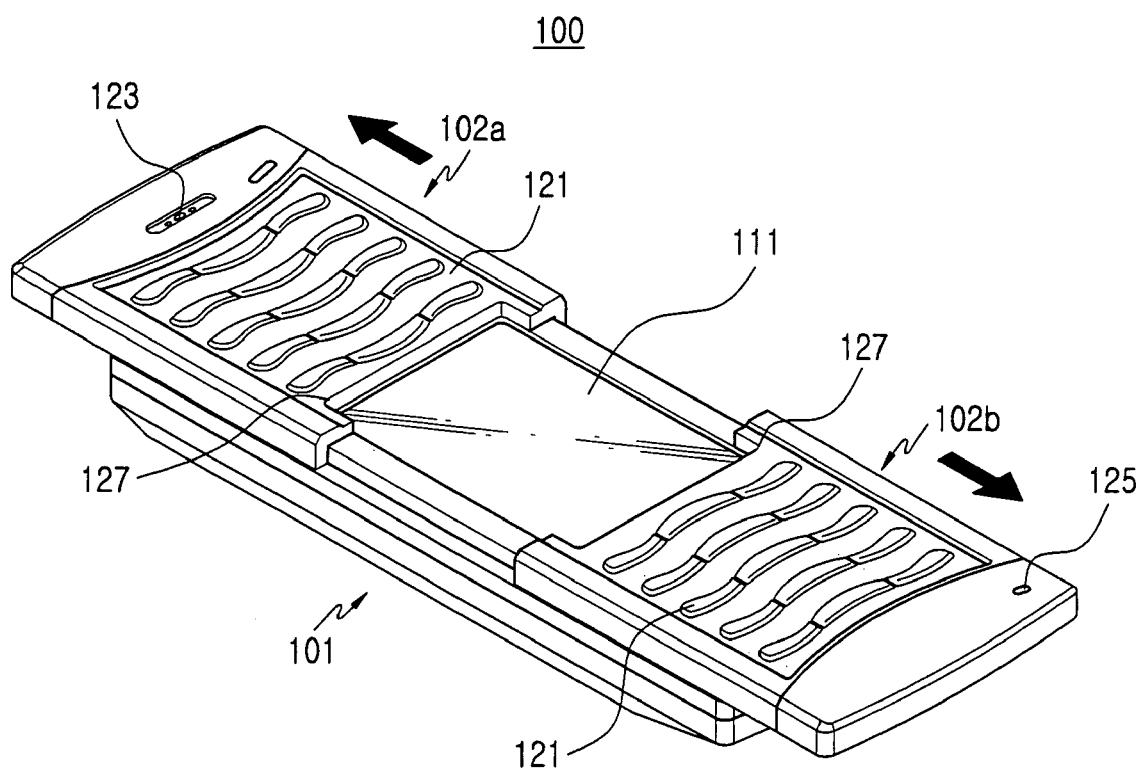
FIG. 2 is a perspective view of the portable terminal shown in FIG. 1 wherein its display device is exposed when the sub-housings of the portable terminal are opened.

FIGS. 1 and 2 are perspective views showing a portable terminal 100 having a sliding module 200 (see FIG. 3) according to the preferred embodiment of the present invention. In particular, FIG. 1 shows the display device 111 of the main housing 101 covered when the sub-housings 102a and 102b are closed, and FIG. 2 shows the display device 111 exposed following a sliding motion of the sub-housings 102a and 102b along the main housing 101 where the sub-housings are opened.

The portable terminal 100 includes a main housing 101 and first and second sub-housings 102a and 102b, which are mounted on an upper surface of the main housing 101 and can move towards or away from each other. Further, the first and second sub-housings 102a and 102b open and close to expose and cover the display device 111 by means of a sliding motion along the main housing 101.

The first and second sub-housings 102a and 102b are mounted on the main housing 101 and perform a semi-automatic sliding motion, i.e., when the display device 111 is closed, it starts to be opened by a user's manipulation. After that, it is automatically opened by the driving force of the sliding module. Such a semi-automatic sliding motion can be repeated in reverse to close the opened display device 111.

Figure 3:
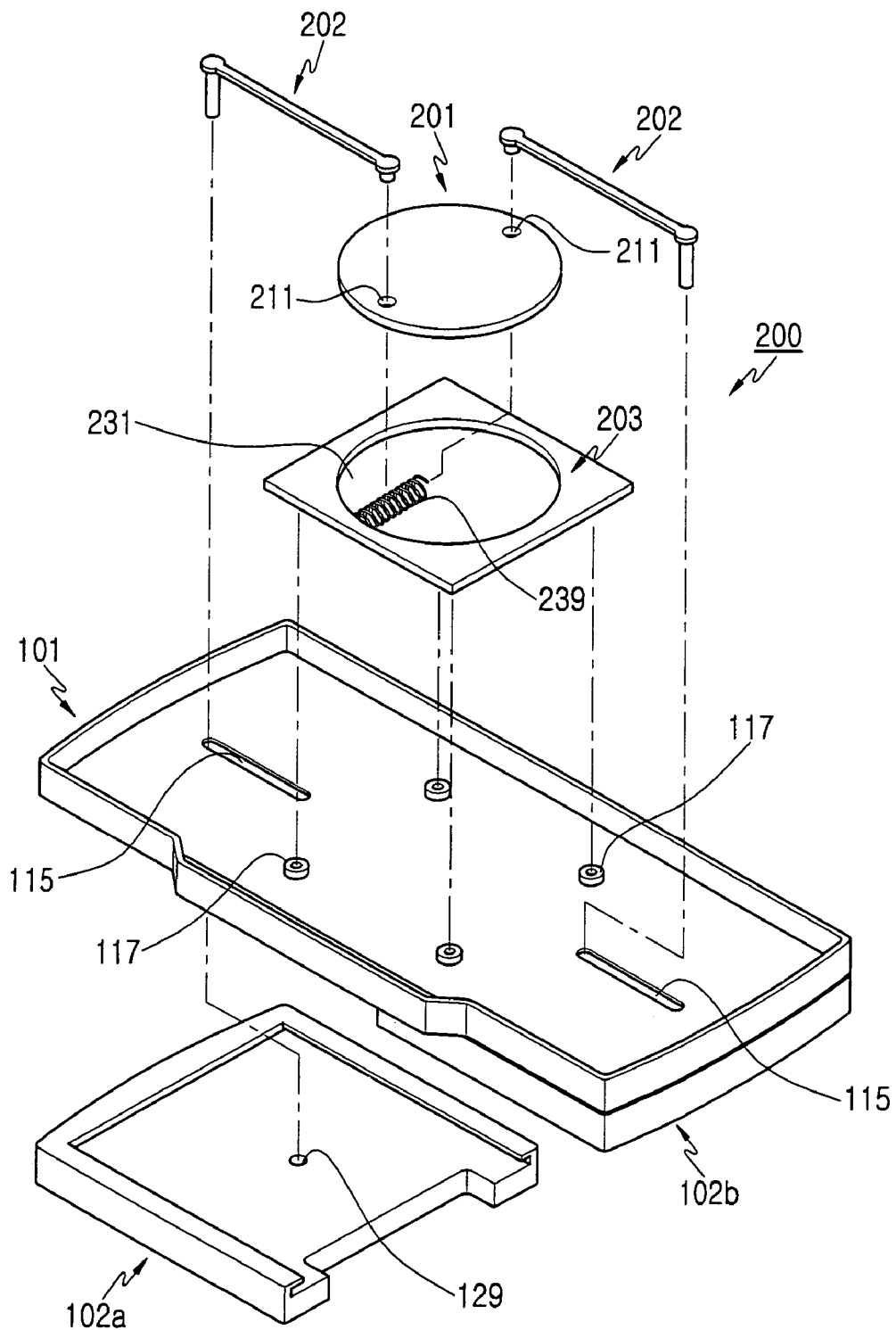
FIG. 3 is an exploded perspective view showing the sliding module for the portable terminal shown in FIG. 1.

The display device 111 is installed on the upper surface of the main housing 101, in particular, on a middle portion thereof. Referring to FIG. 3, each of the longitudinally extending guide holes 115 is formed at the opposite side of the display device, symmetrically. The guide holes 115 extend through the interior and exterior portion of the main housing 101.

As seen in FIGS. 1 and 2, the first and second sub-housings 102a and 102b are provided with, on their upper surfaces, keypads 121 consisting of a number of keys. The first and second sub-housing 102a and 102b also may be provided with, on their upper surfaces, a receiver unit 123 having a speaker device installed thereon, and a transmitter unit 125 having a microphone installed thereon, separated from each other by a gap. Therefore, the terminal 100 can provide voice communication to the users. In other words, users can use the terminal 100 not only to perform voice communication, but also play a game or chat with the terminal 100, after exposing the display device 111 by sliding the first and second sub-housings 102a and 102b away from each other. At this time, as shown in FIG. 2, since each of the keypads 121 is positioned at opposite sides of the display device 111, users can conveniently play a game or chat with both hands.

Meanwhile, each of the first and second sub-housings 102a and 102b may be provided with a window 127 capable of exposing at least part of the display device, even when the display device 111 of the terminal 100 is closed as shown in FIG. 1. Therefore, since at least part of the display device is also exposed when the display device is closed by the first and second sub-housings 102a and 102b, the users can easily check, for example, the time, battery charge level and existence of newly received information.

The first and second sub-housings 102a and 102b are mounted on the main housing 101 through the sliding module 200.

Figure 4:
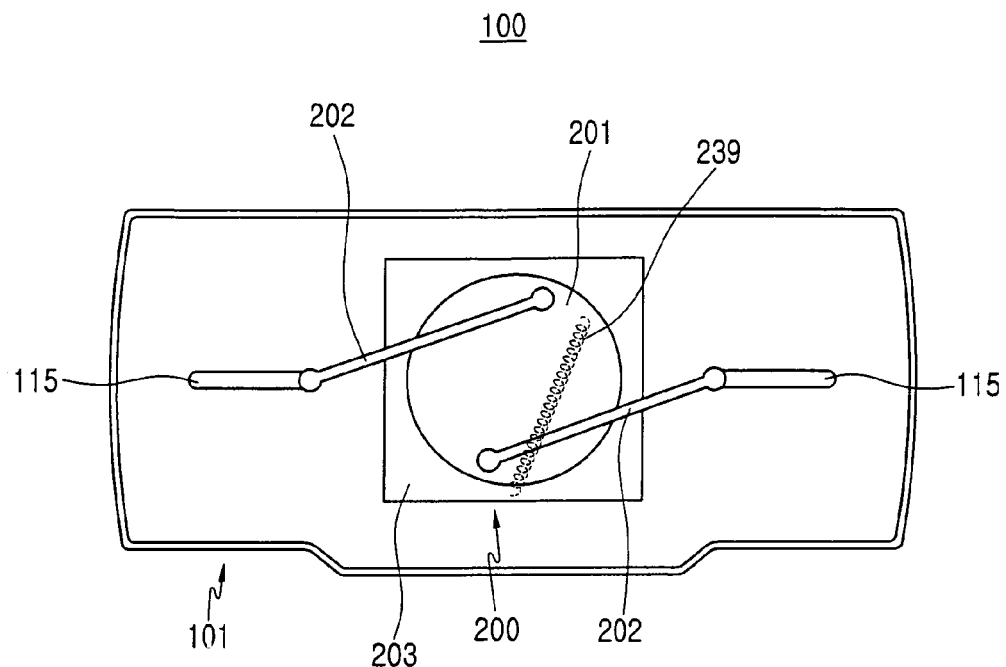
FIG. 4 is a top plan view showing the sliding module for the portable terminal shown in FIG. 1 wherein the display device is completely covered.
Figure 5:
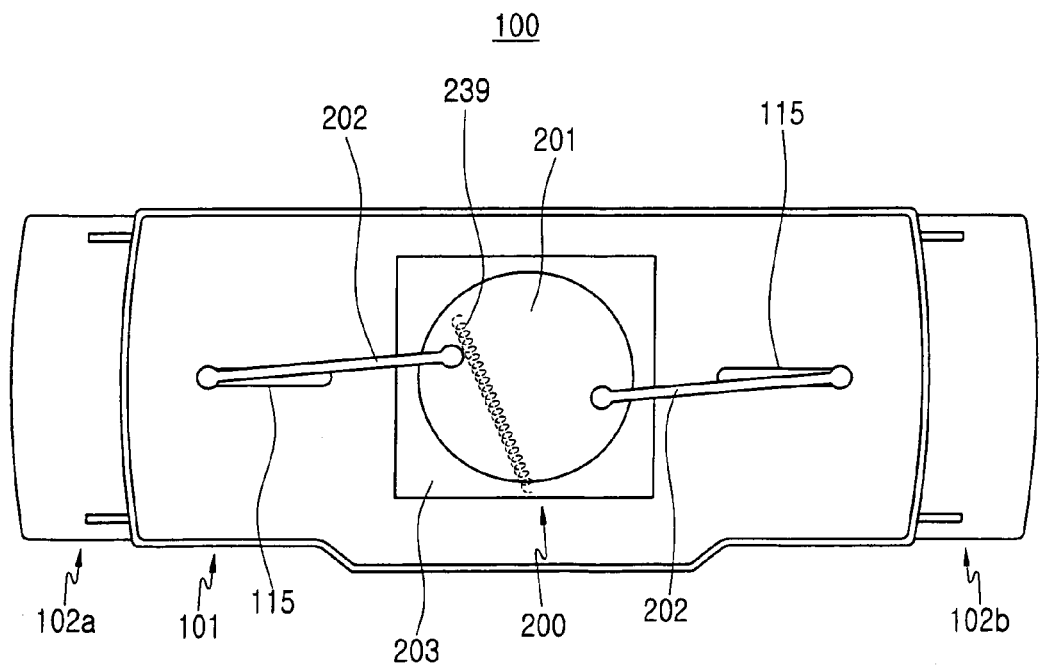
FIG. 5 is a top plan view showing the sliding module for the portable terminal shown in FIG. 1 wherein the display device is completely exposed.

Referring to FIGS. 3 to 5, the sliding module 200 includes a disc 201, links 202, and an elastic means 239. In a first interval, the first and second sub-housings 102a and 102b are subjected to an elastic force applied in such a manner as to move them towards each other, and in a second interval, they are subjected to an elastic force applied in such a manner as to move them away from each other.

The disc 201 is rotatably coupled upon the main housing 101 of the terminal 100. In particular, the main housing 101 is provided with, on its interior surface, a dummy plate 203, and a rotating hole 231 is formed on the dummy plate 203. Additionally, the external surface of the disc 201 is rotatably coupled to the interior side wall of the rotating hole 231.

When the dummy plate 203 is positioned as above, fastening projections 117 are formed on the inside of the main housing 101. The dummy plate 203 is fastened to the inside of the main housing 101, while being spaced a predetermined gap from the inside thereof due to such fastening projections 117. Thus, a space for seating the elastic means 239 is secured in the gap formed between the main housing 101 and the dummy plate 203.

One side of the disc 201 is coupled with the links 202 and the other side of the disc 201 is coupled with the elastic means 239. This prevents the links 202 and the elastic means 239 from interfering with each other while the disc 201 is rotating. Further, when the disc 201 is rotatably coupled to the main housing 101, a dummy plate 203 may be used instead of a structure protruding from the disc 201, such as a rotatable support axis, in order to accomplish an easy installation of links 202 and elastic means 239.

The links 202 includes one pair of links. Each of the links 202 has a first end inserted in the driving hole 211 on disc 201 and a second end inserted through the guide hole 115 of the main housing 101 in one of driven holes 129 formed in the first and second sub-housings 102a and 102b. The first ends of the links 202 rotate about the center of rotation of the disc 201, respectively, and the second ends of the links 202 perform a rectilinear reciprocating motion along the guide holes 115. Thus, when the disc 201 rotates, the second ends of the links 202 perform the rectilinear reciprocating motion along the guide holes 115, and reciprocate the first and second sub-housings 102a and 102b simultaneously. Similarly, if one of the first and second sub-housings 102a and 102b reciprocates on the main housing 101, the links 202 rotate the disc 201, thereby causing the other of the sub-housings to also reciprocate. At this time, the first and second sub-housings 102a and 102b can move towards or away from each other.

Now, referring to FIGS. 4 and 5, it is noted that a displacement range of the second ends of the links 202 is limited by the length of the guide holes 115. Thus, the length of the guide holes 115 limits such displacement range, and it also limits the displacement range of the first and second sub-housings 102a and 102b at the same time. While a pair of the guide holes 115 are symmetrically formed at opposite side of the dummy plate 203, it is not required for the guide holes 115 to be symmetric to each other. However, when one of the guide holes is shorter than the other, the displacement range of the first and second sub-housings 102a and 102b will be limited by the shorter one of the guide holes.

The elastic means 239 has one end supported on the disc 201 and the other end supported on the inside of the main housing 101 or the dummy plate 203. According to this embodiment, the elastic means 239 is preferably a tensioned coil spring. The first and second intervals are divided by the point of time when the elastic means 239 is positioned at the center of rotation of the disc 201. Specifically, the first interval refers to an interval from the time point when the elastic means 239 is positioned at the center of rotation of the disc 201 to the time point when the one end of the elastic means 239 has been moved on the right as shown in FIG. 4. Similarly, the second interval refers to an interval from the time point when the elastic means 239 is positioned at the center of rotation of the disc 201 as shown in FIG. 5 to the time point when the one end of the elastic means 239 has been moved on the left as shown in FIG. 4. The elastic force accumulated in the elastic means 239 will be greatest at the point of time when the elastic means 239 is positioned at the center of rotation of the disc 201, and the first interval and the second interval will be separated by such point of time.

Referring to FIG. 4, the elastic force of the elastic means 239 applies a driving force for rotating the disc 201 clockwise. However, since the opposite ends of the links 202 are held by the disc 201 and the first and second sub-housings 102a and 102b, respectively, the movement of the other ends of the links 202 is limited by the guide holes 115, and the disc 201 will not rotate and remain in a stopped state. At this time, the display device 111 will be closed by the first and second sub-housings 102a and 102b as shown in FIG. 1. Even though there is no limitation to the motion of the other ends of the links 202 by means of the guide holes 115, when the first and second sub-housings 102a and 102b are in contact with each other, the disc 201 will not rotate and remain in a stopped state.

When a user moves one of the first and second sub-housings 102a and 102b to open the display device, the disc 201 will move either one of them while rotating. At this time, if the elastic means 239 is positioned at the first interval, its driving force rotates the disc 201 clockwise. Therefore, the first and second sub-housings 102a and 102b will be subjected to a driving force, which is oriented in the direction to close the display device 111, while the elastic means 239 is positioned in the first interval.

FIG. 5 shows that the elastic means 239 is positioned in the second interval. At this time, the display device 111 is opened by the first and second sub-housings 102a and 102b as shown in FIG. 2. When positioned in the second interval, the elastic means 239 supplies a driving force, which is adapted to rotate the disc 201 counterclockwise. Therefore, in the state in which the elastic means 239 is located in second interval, the elastic means 239 applies a driving force for moving the first and second sub-housings 102a and 102b away from each other.

When the display device 111 is completely opened, the disc 201 will not rotate anymore and remain in a stopped state, regardless of the driving force of the elastic means 239. This is because the links 202 provide a counteractive force, which is oriented in the opposite direction to that of the driving force of the elastic means 239.

During gradual opening of the display device 111, the links 202 move, from the position shown in FIG. 4 to the position where an angle constituted by the links 202 and the guide holes 115 gradually decreases. At this time, as shown in FIG. 5, regardless of completely opening the display device 111, the links 202 still keep a constant slant angle with respect to the guide holes 115. The links 202 provide a counteractive force against the driving force that rotates the disc 201, due to the maintenance of the slant angle with respect to the guide holes 115.

If the links 202 and the guide holes 115 are parallel with each other without such a slant angle, even when the display device 111 has completely been opened, the driving force of the elastic means 239 could further rotate the disc 201 counterclockwise, and then rectilinearly reciprocates the first and second sub-housings 102a and 102b in the direction to close the display device again.

Thus, it should be noted that, when the display device 111 is completely opened, the other ends of the links 202 keep the constant slant angle with respect to the guide holes 115 without further moving by interfering with the ends of the guide holes 115.

However, if the sliding module 200 is provided with a means for limiting the distance that the first and second sub-housings 102a and 102b are moved away from each other along the main housing 101, and when the first and second sub-housings 102a and 102b are contact with each other while the display device 111 being closed, the disc 201 can maintain the stopped state without further rotating and the limitation of the displacement range of the other ends of the links 202 can be eliminated. Further, it will be understood by those skilled in the art that each of the links 202 should keep a constant slant angle with respect to the guide holes 115 when the first and second sub-housings 102a and 102b while moving away from each other.

The slant angle between the links 202 and the guide holes 115 is at least 3 degrees, and in consideration of reliability, it is preferably 5 degrees.

In accordance with the portable terminal 100 having the sliding module configured as above, the opening/closing operation of the terminal to expose or cover display device 111 will be described in detail. If a user rectilinearly moves either one of the first and second sub-housings 102a and 102b while the display device 111 is closed, the links 202 rotate the disc 201 counterclockwise, and the other sub-housing rectilinearly moves by means of the movement of the links 202. At this time, the first and second sub-housings 102a and 102b move away from each other, and the elastic force associated with the disc 201 will be gradually accumulated in the first interval. The elastic force accumulated in the first interval acts as a driving force to rotate the disc 201 clockwise. In other words, when the elastic means 239 is positioned at the first interval, the first and second sub-housings 102a and 102b will be subjected to a driving force, which is adapted to move in the direction to close the display device 111.

When the user further moves either one of the sub-housings so as to position the elastic means 239 at the second interval after passing over the center of rotation of the disc 201, the driving force acting on the elastic means 239 will be oriented counterclockwise. Therefore, the disc 201 will rotate counterclockwise and, at same time, the sub-housings 102a and 102b will move to completely open the display device 111 without further force applied by the user to move the sub-housings.

Similarly, in order to close the display device 111 again, when the elastic means 239 is positioned at the first interval after passing over the center of rotation of the disc 201, the disc 201 will rotate clockwise and close the display device 111 without further force applied by the user to move the sub-housings.

Namely, once a user rectilinearly moves the first and second sub-housings 102a and 102b along only a part of the interval in which the first and second sub-housings 102a and 102b can linearly move, the first and second sub-housings 102a and 102b continue to be moved by the driving force of the elastic means 239 along the other part of such interval. That is, a semi-automatic opening/closing operation of the first and second sub-housings 102a and 102b is achieved.

Meanwhile, within the rotatable range of the disc 201 or the rectilinearly movable range of the other ends of the links 202, the first part of such interval is referred to as the first interval and the other part thereof is referred to as the second interval. At this time, the range of areas occupying the first interval and the second interval can be varied according to the position to which the one end of the elastic means 239 is fixed.

Namely, in the state as shown in FIG. 4, when one end of elastic means 239 is coupled on the disc 201 such a manner that the elastic means 239 is positioned near to the center of rotation of the disc 201, the first interval will be relatively shorter and the second interval will be longer. In this case, the direct operation of the first and second sub-housings 102a and 102b, conducted by the user, to open the display device 111 will be reduced, but the operation for closing the display device 111 will be increased.

Similarly, in the state as shown in FIG. 4, when one end of elastic means 239 is coupled on the disc 201 such a manner that the elastic means is positioned far from the center of rotation of the disc 201, the operation for opening the display device 111 will be increased more than the operation for closing it.

In describing the specific embodiments of the present invention, it should be noted that the rotating direction of the disc, i.e., clockwise or counterclockwise direction, is based upon the drawings shown in FIGS. 4 and 5. Though a tension spring is used as the elastic means in above specific embodiments of the present invention, it is also possible to use any structures which make the elastic force accumulated at a boundary point separating the first interval and the second interval to be maximized, for example, a compressible coil spring or torsion coil spring.

Additionally, while the terminal structure according to the specific embodiments of the present invention, wherein a pair of sub-housings is adapted to move closer to or away from each other, is described, it is also applicable to easily embody the semi-automatic opening/closing operation of the terminal in which any number of sub-housings perform a sliding motion. This can be accomplished by using only one sub-housing and one link associated with the configuration of the sliding module.

As mentioned above, the sliding module according to the present invention, wherein the first and second sub-housings are adapted to slide along the main housing to move toward or away from each other so as to open/close the display device, is advantageous in that users can manipulate the keypads positioned at opposite side of the display device with both hands, so that they can conveniently play a game or chat after opening the display device. Also, the sliding module according to the present invention having the first and second sub-housings which can move one sub-housing by only one sub-housing's manipulation and can realize the semi-automatic opening/closing operation of the terminal, is advantageous in that users can conveniently open/close the display device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding module for a portable terminal including a main housing, the sliding module comprising:

at least one sub-housing movably mounted on the main housing in an opening/closing motion, the at least one sub-housing moving with respect to the main housing in a first interval and a second interval;

a disc rotatably mounted on the main housing and rotating about a rotation center;

a plurality of links, each of which has a first end coupled to the disc and a second end coupled to each of the at least one sub-housing; and an elastic means providing the disc with a rotating force moving the at least one sub-housing toward the main body in the first interval and moving the at least one sub-housing away from the main body in the second interval, the elastic means passing through the rotation center when the at least one sub-housing moves from one of the first interval and the second interval to the other of the first interval and the second interval.

2. A sliding module for a portable terminal as claimed in claim 1, wherein the elastic means is a coil spring.

3. A sliding module for a portable terminal as claimed in claim 1, wherein the at least one sub-housing comprises a pair of sub-housings mounted on the main housing in side by side relation.

4. A sliding module for a portable terminal as claimed in claim 3, wherein the pair of sub-housings are subjected to a first driving force, in the first interval, which is oriented to move the sub-housings towards each other, and subjected to a second driving force, in the second interval, which is oriented to move the sub-housings away from each other.

5. A sliding module for a portable terminal as claimed in claim 3, wherein the links are symmetrically installed with respect to the rotation center.

6. A sliding module for a portable terminal as claimed in claim 1, wherein the elastic means is a coil spring having a first end supported on the main housing and a second end supported on the disc.

* * * * *